March 16, 1954 — J. B. FILGER — 2,672,141
SPRAY BOTTLE WITH IRREMOVABLE HEAD
Filed March 22, 1950 — 2 Sheets-Sheet 1

INVENTOR.
BY Joseph B. Filger
Wood, Arey, Henson & Evans
ATTORNEYS

March 16, 1954 J. B. FILGER 2,672,141
SPRAY BOTTLE WITH IRREMOVABLE HEAD
Filed March 22, 1950 2 Sheets-Sheet 2

INVENTOR.
Joseph B. Filger
BY Wood, Arey, Henry & Evans
ATTORNEYS

Patented Mar. 16, 1954

2,672,141

UNITED STATES PATENT OFFICE 2,672,141

SPRAY BOTTLE WITH IRREMOVABLE HEAD

Joseph B. Filger, Cincinnati, Ohio

Application March 22, 1950, Serial No. 151,113

1 Claim. (Cl. 128—173)

This invention relates to a small bottle or vial formed from a flexible plastic material such as polyethylene or the like, and is particularly concerned with a structure of this general type in which the main bottle and neck portion on one hand and the spray head on the other are formed as separate elements and are then assembled in such a way that it is impossible or practically impossible to remove the spray head without destroying the entire bottle. This type of arrangement has a particular utility where it is desired to provide a bottle which can be easily manufactured, filled and assembled but which thereafter cannot readily be refilled, and will accordingly be considered a disposable item.

In the blowing of small bottles and vials from a plastic such as polyethylene or the like, it has been found to be exceedingly difficult to form an entire bottle including a conventional spray head in which the outlines are clear and sharp. Almost invariably because of the tapered outlines of the spray head, the resultant blown bottle will have rough edges which require trimming and smoothing to constitute it an acceptable commercial structure. This problem is peculiar to the spray head only and is not encountered in forming the main portion of the bottle or even in forming a protruding neck of the conventional type.

In order to overcome the above difficulty, it has been a concept of this invention to form the main body portion and neck by the conventional blowing process, to form the spray head as a separate and distinct element, possibly from polyethylene or like material or possibly from some other material, and then to assemble the two parts in such a way that it will be difficult, if not impossible, to separate them one from the other for refilling purposes.

In the consideration of this concept, it must be noted that polyethylene is a comparatively new material, at least for forming bottles, and while it possesses a number of unusual advantages for this purpose, it is also open to certain objections particularly in the technique of the manufacture and assembly of the bottles and their integral parts. Among the advantages is the particular one of flexibility which permits the bottle to be utilized as a bulb for squirting or spraying liquids from an open end. The material is also substantially impervious to chemical action, is attractive in appearance, possesses excellent wearing qualities and is relatively low in cost. However, as previously noted, it is not an easy material to work with, at least in the present state of its development for container purposes.

Having in mind this general statement of the objectives of the invention, reference is now made to the drawings in which:

In Figure 11, these assembled elements are shown in combination with an inserted aspirating tube.

Figure 1:
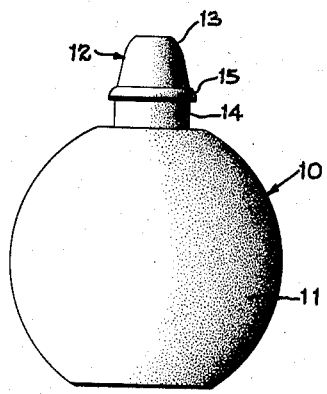
Figure 1 represents a side elevation of a typical bottle constituting a preferred embodiment of the invention.
Figure 2:
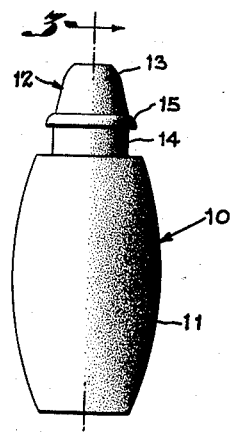
Figure 2 is an end elevation of the same bottle.

Referring again to the drawings for a further and more detailed description of the different forms of the invention therein illustrated, the complete assembly of the bottle and head has been designated generally as 10, Figure 1. This assembly comprises the principal parts of a bottle proper 11, and a spray head designated generally as 12. The spray head includes a nasal insertion portion 13 having rounded contours configurated to correspond generally with the nostril of the user, a neck portion 14 and a peripheral flange 15 contiguous with nozzle configurated portion 13. The complete assembly has been designed to provide a unit which can be readily grasped in the hand and which will fit conveniently in a pocket or purse.

Figure 3:
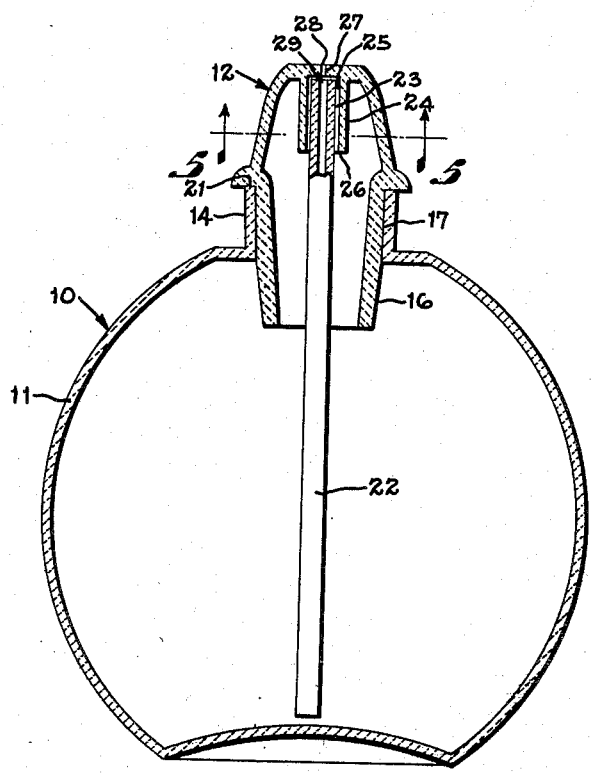
Figure 3 is a sectional view along the line 3—3, Figure 2, showing the assembly of the separable elements constituting one form of the invention.
Figure 4:
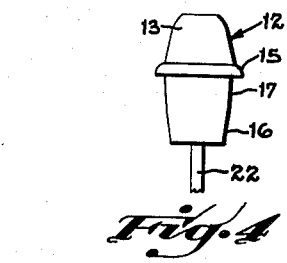
Figure 4 is an elevational view of the spray head element alone with a portion of the atomizing tube extending therefrom.
Figure 5:
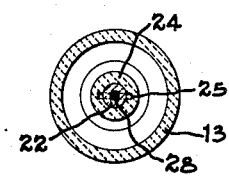
Figure 5 is a sectional view along the line 5—5, Figure 3.
Figure 7:
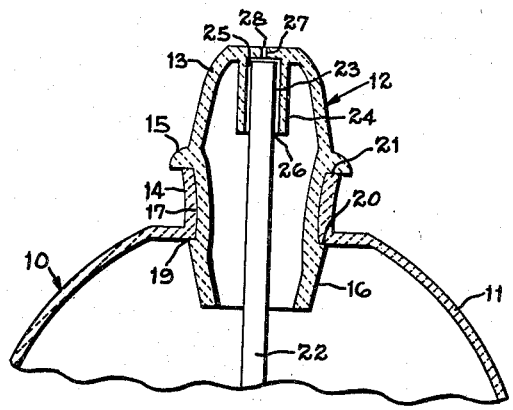
Figure 7 is a fragmentary view similar to Figure 3 illustrating the preferred form of assembly of the separable elements constituting the entire bottle.
Figure 8:
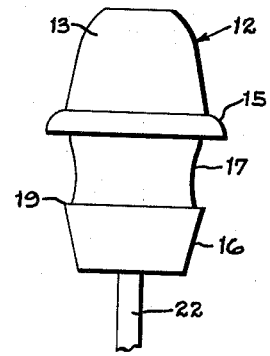
Figure 8 is a view similar to Figure 4 showing the preferred form of spray head with a portion of the aspirating tube extending therefrom.

The arrangement of the various elements and the manner of assembly are best illustrated in Figures 3 and 5 showing one form of the invention and Figure 7 showing a preferred form. In these views, like numbers designate like parts in so far as is practicable in view of the slight differences of construction.

The lower end 16 of the spray head 12 has its side walls tapered inwardly to permit ready insertion of the spray head through the neck 14 of the bottle proper. As will be noted, the end 16 depends below the lower edge of this neck for a comparatively substantial distance. The intermediate or shank portion 17 of the side walls of the spray head is preferably substantially vertical as shown in Figure 3. In the form shown in Figure 7, a peripheral flange 19 is formed between the lower portion of the spray head and the shank portion, and is adapted to engage with the shoulder 20 formed between the inner surface of the bottle and its neck 14.

In both forms, the lower edge of the peripheral flange 15 is adapted to seat on the upper edge 21 of the neck 14, thereby limiting the degree to which the head 12 can be inserted in the neck. In the form shown in Figure 7 when this seating has been attained, an interlock is provided between the flange 19 and the shoulder 20, thereby rendering it practically impossible to remove the head from the bottle. While the form shown in Figure 3 omits this interlock, an effective result can be attained by having the diameter of the head slightly oversize with respect to the diameter of the neck so that there is a very tight press fit between these elements when the head is inserted, and if desired, an adhesive may also be utilized to provide a still stronger bond. The difficulty of removal as compared with insertion is accentuated in this form because the tapered edges of the end 16 facilitate the insertion and because the over-all size of the spray head makes it difficult to grasp with the fingers.

The construction which provides for the aspiration of a liquid contained in the bottle includes a hollow tube 22 preferably formed of polyethylene or the like press-fitted into position in the bore 23 formed in the plug 24 depending from the under side of the spray head. As best shown in Figure 5, a channel 25 of inverted U configuration is provided in the head adjacent its point of engagement with the side walls of the tube. This channel has its lower ends 26 opening into the bottle cavity and is interconnected with a second channel 27 which extends to the outlet aperture 28 in the upper surface of the head.

In the operation of the device, as illustrated in either Figure 3 or Figure 7, as the bottle is squeezed, air from the interior of the bottle is forced into the channel 25 through the openings 26 and because of the Bernoulli effect created, the medication rises in the tube until at the point 29 it is contacted by the upwardly moving air stream, aspirated, and ejected through the aperture 28 as a fine mist.

The preferred material from which the spray head is formed is an acrylic resin, such as Lucite which has a substantial degree of hardness and can readily be finished to provide smooth and even contours. However, it may also be formed from polyethylene or metal or glass. All of these materials lend themselves readily to a molding process. As previously indicated, the aspirating tube 22 is preferably formed from polyethylene, although other materials may be utilized. In the construction of the spray head, one method which may be used is to mold a head having side walls configurated as illustrated in Figure 3 and then to shave or trim the shank portion 17 peripherally to the configuration shown in Figure 7. If desired, the thickness of the walls may be increased somewhat so that even after the trimming operation there will be sufficient thickness at the shank portion.

Figure 9:
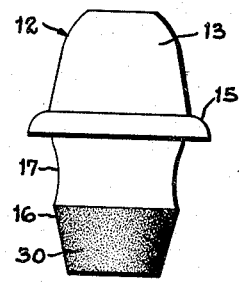
Figures 9, 10 and 11 illustrate successive steps in the formation of a spray head by a modified method in which a lower shell element illustrated in Figure 10 is secured by adhesive to the lower end of the spray head proper illustrated in Figure 9.
Figure 10:
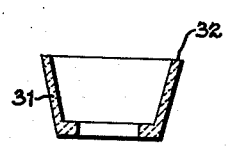
Figure 11:
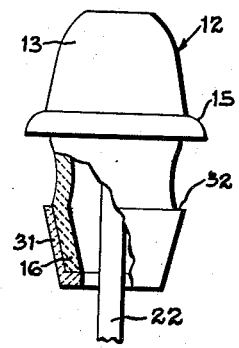

In Figures 9-11, there is illustrated a second method of constructing a spray head of the type shown in Figure 7. In the utilization of this method, the lower end of the head 16 is formed undersized as compared with its ultimate contours, a coating of adhesive 30 is applied to it, and the separate shell element 31 is fitted and secured in position in the manner illustrated in Figure 11. By use of an appropriate adhesive, the resultant bond will be sufficiently strong for the purposes intended and the upper edges 32 of the shell form the peripheral flange which is designated 19 in Figure 7. It is even possible to effect this assembly without the use of adhesive provided the parts are dimensioned exactly.

Figure 12:
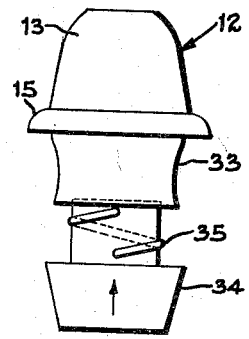
Figures 12 and 13 illustrate another modification in the method of assembly, the lower and upper portions of the spray head being formed in this instance with screw threads and then assembled as particularly illustrated in Figure 13.
Figure 13:
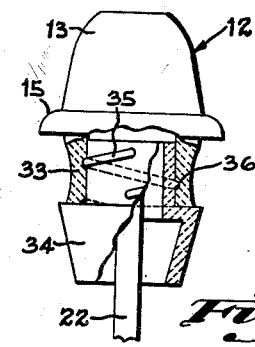

A second alternate method of assembly of the parts is illustrated in Figures 12 and 13. As particularly illustrated in Figure 13, the spray head is formed in two parts designated 33 and 34 respectively. The lower part 34 has screw threads 35 formed on its outer surface which engage with thread receiving slots 36 in part 33, thereby providing a secure and unitary structure. The purpose of using either of the two methods just discussed is to avoid the difficulties of molding in view of the peripheral flange 19 which constitutes a serious obstacle to the use of this process.

In the assembly of the preferred form of the invention as illustrated in Figure 7, the lower end 16 of the spray head is introduced into the neck of the bottle and pressure is exerted in a downward direction. As the insertion progresses, the spray head having a larger diameter, particularly in the vicinity of the flange 19, expands the neck of the bottle until the flange 19 has passed through, whereupon the neck contracts, gripping the spray head very tightly and holding it in position. A similar action takes place in the structure illustrated in Figure 3 except that in this form, the gripping is provided by pressure only and not by interlocking.

The construction illustrated has many advantages both in manufacture and use. The difficulties attendant the blowing of polyethylene to form a spray head have been avoided by providing the spray head as a separate element, preferably formed from materials which can be molded rather than blown. Aside from the other advantages attendant the use of polyethylene bottles for purposes of this type, this invention provides the particular advantage that the bottle is essentially disposable and must be thrown away by the purchaser after use. This is particularly advantageous in connection with medications such as nose drops where the manufacturer does not wish his bottle to be used to contain any other material except that of his own manufacture.

Figure 6:
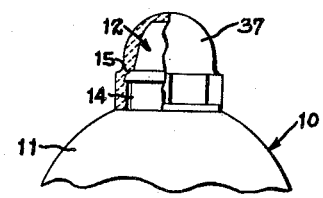
Figure 6 is a fragmentary view of the upper portion of the bottle shown in Figure 1 with a closure cap positioned thereon, the cap being partly broken away to illustrate its engagement with the spray head.

The completed unit preferably has a closure cap 37, as illustrated in Figure 6, but the form shown is merely representative and forms no part of the present invention.

Having fully described my invention, I claim:

In combination with a bottle formed from a flexible material such as polyethylene or the like, said bottle having a neck extending therefrom, the inner surface of said bottle being configurated to form a shoulder at the juncture of said neck, a spray head formed of a rigid, hard surfaced plastic material, said spray head being of generally cylindrical configuration and having an internal passageway extending from one end to the other, the upper surface of said spray head being rounded to correspond to the internal configuration of a nostril, an upper peripheral flange formed on the outer surface of the spray head contiguous with the nostril configurated portion, said flange being seated upon the upper edge of the bottle neck and being effective to limit the degree of insertion of the spray head into the bottle, said spray head also including a shank depending from the upper portion of the head, a lower peripheral flange of a diameter slightly greater than the internal diameter of the neck formed on said shank, said lower peripheral flange being in interlocking engagement with said shoulder, the lowermost end of said spray head being disposed internally of said bottle and tapering inwardly from said lower peripheral flange to a diameter less than the inner diameter of said neck, and an atomizing tube secured to the spray head and depending into the interior of the bottle.

JOSEPH B. FILGER.

References Cited in the file of this patent

UNITED STATES PATENTS

| Number | Name | Date |
|---|---|---|
| 423,198 | Windolph | Mar. 11, 1890 |
| 443,545 | Rowland | Dec. 30, 1890 |
| 445,813 | Leisenring | Feb. 3, 1891 |
| 697,798 | Brooks | Apr. 15, 1902 |
| 781,182 | Brewington | Jan. 31, 1905 |
| 1,655,678 | Dorment | Jan. 10, 1928 |
| 1,716,525 | Leong | June 11, 1929 |
| 2,571,921 | Morris | Oct. 16, 1951 |

OTHER REFERENCES

Modern Plastics, vol. 25, No. 6, Feb., 1948, pg. 79. (Copy in Division 55).